United States Patent [19]

Helms et al.

[11] Patent Number: 6,087,426
[45] Date of Patent: Jul. 11, 2000

[54] THERMOPLASTIC IONIC CONDUCTOR

[75] Inventors: Jeffrey Hampton Helms, Plymouth, Mich.; Edmund Joseph Blais, Windsor, Canada

[73] Assignee: Ford Global Technologies, Inc., Dearborn, Mich.

[21] Appl. No.: 08/161,618

[22] Filed: Dec. 6, 1993

[51] Int. Cl.[7] .................................................. C08K 5/06
[52] U.S. Cl. ........................ 524/377; 252/511; 252/518
[58] Field of Search ............................ 524/377; 252/511, 252/518

[56] References Cited

U.S. PATENT DOCUMENTS

| | | | |
|---|---|---|---|
| 3,357,930 | 12/1967 | Marks et al. ............................ | 252/518 |
| 3,521,941 | 7/1970 | Deb et al. ............................... | 359/275 |
| 3,989,540 | 11/1976 | Feuillade et al. ...................... | 29/623.1 |
| 4,193,670 | 3/1980 | Giglia et al. ............................ | 359/274 |
| 4,277,147 | 7/1981 | Arnoldussen ........................... | 359/270 |
| 4,573,768 | 3/1986 | Polak et al. ............................ | 359/270 |
| 4,750,817 | 6/1988 | Sammells ............................... | 359/270 |
| 4,807,977 | 2/1989 | Sammells ............................... | 359/270 |
| 4,810,067 | 3/1989 | Demiryont ............................. | 359/265 |
| 4,828,369 | 5/1989 | Hotomi .................................. | 359/270 |
| 4,993,810 | 2/1991 | Demiryont ............................. | 359/265 |
| 5,016,991 | 5/1991 | Mason .................................... | 359/265 |
| 5,111,328 | 5/1992 | Demiryont ............................. | 359/265 |
| 5,111,329 | 5/1992 | Gajewski et al. ...................... | 359/275 |
| 5,122,487 | 6/1992 | Hayakawa et al. .................... | 501/103 |
| 5,124,832 | 6/1992 | Greenberg et al. .................... | 359/269 |
| 5,138,481 | 8/1992 | Demiryont ............................. | 359/269 |
| 5,275,750 | 1/1994 | Sato et al. .............................. | 252/62.2 |
| 5,327,281 | 7/1994 | Cogan et al. .......................... | 359/270 |
| 5,337,184 | 8/1994 | Helms et al. .......................... | 359/270 |

OTHER PUBLICATIONS

Derwent Publications Ltd., London, GB; Section Ch, Week 8239; AN 82–82893E & JP–A–57 137 359 (Nippon Electric KK), Aug. 24, 1982 *abstract*.

*Primary Examiner*—Terrel Morris
*Assistant Examiner*—John J. Guarriello
*Attorney, Agent, or Firm*—Lorraine S. Melotik

[57] ABSTRACT

This invention is directed to a solid, thermoplastic composition which is conductive to ions while being an electrical insulator. More particularly, the composition comprises (a) a terpolymer of vinyl butyryl, vinyl alcohol, and vinyl acetate, (b) a plasticizer for the terpolymer, and (c) alkali metal salt.

7 Claims, No Drawings

THERMOPLASTIC IONIC CONDUCTOR

BACKGROUND OF THE INVENTION

This invention is directed to a solid, thermoplastic composition which is conductive to ions while being an electrical insulator. More particularly, the composition comprises a plasticized terpolymer of vinyl butyryl, vinyl alcohol, and vinyl acetate and alkali metal salt.

Liquid electrolytes have conventionally been used in electrochromic devices, batteries, sensors, and capacitors. Electrochromic devices comprise an assembly of parallel layers of materials including electrodes and therebetween an electrochromic material and an electrolyte. Upon providing a current across the electrodes, the electrochromic material changes color. Such devices have been suggested to moderate light transmittance in sunroofs or windshields. When liquid electrolytes are employed in electrochromic devices, there is the possibility of leakage of the electrolyte out of the device, the inherent difficulty of sealing the device, and the obvious lack of mechanical strength and adhesion of the electrolyte layer to the adjacent layer.

Various solid electrolytes have been suggested for use in electrochromic devices. Solid electrolytes of complex halides are known, particularly iodides of silver with an alkali metal. Additionally, solid electrolytes may comprise aluminum compounds such as sodium beta-alumina and potassium beta-alumina. However, these electrolytes are all typically expensive to prepare and, in the case of the alumina compounds, could not be formed directly on components of an electrochromic device since they require very high processing temperatures. Because of the rigidity of solid materials, it is also difficult to assemble the component layers of an electrochromic device and achieve the intimate contact required between the solid electrolyte and the adjacent layers, particularly if the surfaces of the device are curved.

Such problems are minimized with polymeric electrolytes which are generally either extremely viscous liquids or tacky solids. It would be desirable, however, if the polymeric electrolytes were solids which could be formed into self-supporting films with a degree of flexibility to allow uncomplicated device fabrication.

One approach to forming such a flexible solid material involves copolymerization of polyethylene oxide and polypropylene oxide and results in systems having good conductivity at room temperature, but a markedly reduced ionic conductivity at low temperatures. Another approach to the formation of room temperature flexible solid polymer electrolytes includes forming materials having backbones of phosphazene and siloxane-based polymers with etheric side chains. These materials generally lack appreciable dimensional stability and must be chemically or radiationally cross-linked. In addition, the susceptibility of the Si—O—C bonds to hydrolysis and subsequent structural degradation constitute a severe problem unless moisture can be entirely eliminated.

Yet another approach is directed to a complex of poly(2-methoxy polyethylene glycol monomethacrylates) with a lithium salt of triflic acid having etheric side chains of 9–22 ethylene oxide units. Similar polymers copolymerized with styrene have also been suggested. Common problems encountered by each of these is the inverse relationship between optimization of the ionic conductivity and simultaneously the mechanical properties. The dependence of ionic conductivity on salt concentration in amorphous materials must also be optimized. Decreasing the salt content, while it desirably reduces crystallinity may also reduce the mechanical strength and ionic conductivity of the resulting material. In these and similar systems, purification and neutralization steps necessary in processing such materials is very time-consuming.

The present invention provides a thermoplastic ionic conductor that overcomes the deficiencies of the foregoing materials in that it is easily prepared, exhibits high temperature stability, requires no curing reaction, forms tough flexible free-standing films easily applied to a surface with curvature, shows strong adherence to glass and coatings, and may be used in current manufacturing processes for laminated glass products. It is a thermoplastic material able to perform well in an electrochromic-laminated glass systems, including automotive windshield applications.

SUMMARY OF THE INVENTION

The invention is directed to a solid, thermoplastic composition which is electrically insulating and ironically conducting. It comprises a terpolymer, a nonreactive plasticizer for the terpolymer, and alkali metal salt. The terpolymer comprises vinyl butyryl, vinyl alcohol, and vinyl acetate in weight fractions of 0.7 to 0.9, 0.1 to 0.3, and 0.01 to 0.05, respectively. The terpolymer has a number average molecular weight between about 20,000 and 300,000 and has a $T_g$ in the range of 40°–80° C. The composition comprises a polyether containing plasticizer, non-reactive with the terpolymer, included in an amount up to about 50% by weight based on the amount of terpolymer present in the composition. The composition has a $T_g$ between –25° and 40° C. The alkali salt is present in the composition in an amount preferably between 5:1 and 20:1, based on the weight ratio of plasticizer:salt present in the composition.

According to another embodiment of the invention, it is directed to an electrochromic device comprising two substrates and therebetween: one electrode layer, an electrochromic layer; an ion conductive layer, another electrochromic layer or other functional counterelectrode to the first electrochromic layer, and another electrode layer. At least one of the electrode layers is transparent and each electrode layer is in contact with a respective one of the substrates. The ion conductive layer is adapted to communicate ions to and from the electrochromic layer upon application of a voltage across the electrode layers. The ion conductive layer of the electrochromic device comprises the solid, thermoplastic ionic conductor composition disclosed above.

DETAILED DESCRIPTION OF PREFERRED EMBODIMENTS

The solid, thermoplastic ionic conductor composition of the invention as described above comprises a terpolymer comprising copolymerized vinyl butyryl, vinyl alcohol, and vinyl acetate monomers so as to be present in the terpolymer in weight fractions of 0.7 to 0.9, 0.1 to 0.3 and 0.01 to 0.05, respectively. More preferably, the weight fractions are 0.8 to 0.9, 0.1 to 0.2, and 0.01 to 0.025, respectively. The terpolymer's number average molecular weight is between 20,000 and 300,000, the preferred molecular weight range being 50,000 to 200,000, and it has a $T_g$ in the range of 40°–80° C., preferably 60°–80° C. Techniques for forming terpolymers of such monomers are well known to those skilled in the art. One such exemplary technique involves the polymerization of vinyl acetate followed by acid or base hydrolysis thereof to create predominantly polyvinyl alcohol (PVOH) and the subsequent reaction of PVOH with butyl aldehyde to complete polyvinyl butyral, (PVB), terpolymer formation. Such terpolymers are commercially available from Monsanto Chemical Company and E. I. Dupont De Neumours and Company. Monsanto Butvar® grades TG, B-72, and B-76 for use in the present invention are available commercially.

Another component of the invention thermoplastic composition is liquid polyether containing plasticizer chosen to be chemically compatible with the terpolymer and employed in the composition in an amount of up to about 50% by weight based on the amount of terpolymer present in the composition. The plasticized composition has a $T_g$ between −25° C. and 40° C. By "polyether containing" is meant that the plasticizer contains polyether moiety in the plasticizer compound formula. Exemplary of polyether containing plasticizer which may be used singly or as mixtures thereof in the present invention composition include, but are not limited to, dimethyl ethers of polyethylene glycols such as tetraethylene glycol dimethyl ether; polypropylene carbonate; polyether phesters such as: tetraethylene glycol di-heptanoate or di-2-hexyladipate; polyether polyols; polyethyere glycol perlargonates; or other inert, i.e., substantially non-reactive with the terpolymer, low vapor pressure, alkali metal solvating liquids compatible with the terpolymer.

The alkali metal salt, another component of the thermoplastic composition, is preferably a salt of sodium or lithium, including, but not limited to, nitrates, chlorides, chlorates, sulfonates and sulfates thereof. Exemplary of such materials are lithium perchlorate and lithium trifluoromethane sulfonate. The latter is preferred since it is less hydroscopic that lithium perchlorate. Mixtures of various alkali metal salts may also be employed in the composition. The alkali metal salt, present in the composition dissolved or dispersed in the plasticizer, is present in the composition in an amount which depends upon the particular plasticizer chosen. The amount of alkali metal salt present in the composition preferably is between 5:1 and 20:1 based on the weight ratio of plasticizer:salt. While lesser amounts are suitable, the optimal ionic conductivity is imparted to the composition with the preferred amounts. The composition is essentially electrically insulating since the electric conductivity of the plasticizer/alkalimetal salt is on the order of $10^{-4}$ $\Omega^{-1}cm^{-1}$ or less at room temperature as determined by AC spectroscopic determination of the bulk impedance value from analysis of the frequency dependent Nyquist plot.

The ionic conductivity of the invention composition preferably is between about $10^{-3}$ $\Omega^{-1}cm^{-1}$ and $10^{-6}$ $\Omega^{-1}cm^{-1}$ over an operational temperature range, which for automotive applications is generally between about −40° C. and 120° C. Without plasticization, the terpolymer will not conduct. With plasticization, this ionic conductivity is easily obtained and the temperature dependence of the conductivity is minimized. The mechanical strength of the composition is inversely proportional to the amount of the plasticizer while the ionic conductivity, in contrast, increases with increasing plasticizer level. Material optimization requires maximizing the ionic conductivity and the mechanical strength of the composition when employed, e.g., as a film. The resultant films are tough but flexible with excellent ionic conductivities.

The composition may be formed by combining the components in any suitable manner. Most commonly, in forming the invention thermoplastic composition, the terpolymer is combined with a pre-formed solution of plasticizer and alkali metal salt. The terpolymer may be first dissolved in a low boiling solvent, e.g., methanol, to which is then added the plasticizer/alkali salt mixture. In such an embodiment of making the composition, the solvent is then removed, leaving the thermoplastic ionic conductor composition. According to another embodiment of forming the invention thermoplastic composition, the terpolymer may be ground to form a powder which is then milled with a plasticizer/alkali salt solution to form a material which is subsequently extruded at an elevated temperature to form the present invention thermoplastic ionic conductor composition. This simple method yields a solvent free composition. As disclosed above, alkali metal salts which are less hygroscopic than lithium perchlorate, such as lithium trifluoromethane sulfonate (3M FC-122), are preferred. In the event that water adsorption leads to a cloudy solution, increasing the plasticizer/salt ratio within those described herein will provide a clear solution.

As disclosed herein, the ionic conductor composition may be used in such devices as batteries, electrochromic displays, sensors, and capacitors. Exemplary of electrochromic devices are those disclosed in U.S. Pat. No. 5,016,991, which reference is hereby expressly incorporated by reference for such teachings. It comprises two substrates, and therebetween: one electrode layer; an ion conductive layer; an electrochromic layer; and another electrode layer, at least one of the one electrode layer and the other electrode layer being transparent, and each electrode layer being in contact with a respective one of the substrates, the ion conductive layer being adapted to communicate ions to and from the electrochromic layer upon application of a voltage across the electrode layers. The thermoplastic ionic conductor composition of this invention is employed as the ionic conductive layer of the electrochromic device. The device may further comprise other layers, for example counter electrodes or other electrochromic layers. Such a device may be incorporated as part of a windshield, interior and exterior autodimming mirrors, strictly architectural applications including privacy dividers, etc. as would be apparent to those skilled in the art in view of this disclosure. Generally, in such applications, the electrolyte layer would optimally be 20–30 mils or thicker if used in windshields, but thinner in non-structural applications such as autodimming mirrors. As discussed herein, the thermoplastic composition may be made in various ways. All are applicable to forming a free standing layer of the composition which may be used as the electrolyte layer in an electrochromic device. For example, the ion conductive layer can be made by dissolving all components in a common low boiling solvent such as methanol followed by solvent removal under mild conditions (i.e., low heat, moderate vacuum, or low heat under a dry inert gas purge). The bulk material is then heated above its flow temperature and cast into the desired shape. According to another method, the polymer component is ground into a powder at low temperature and mixed with a plasticizer/salt solution by normal techniques including ball milling or compounding. The resulting mixture is extruded or cast at elevated temperature. Advantageously, the layer of the present invention composition can be made as a free standing film for easy assembly into such devices and acts as an adhesive in holding the layers of the device together. Still other methods will be apparent to those skilled in the art in view of the present disclosure.

Optimally, the non-electrically conducting, component of the ironically conducting invention composition comprises a terpolymer having a number average molecular weight between 50,000 and 200,000, a plasticizer level of 30–50 weight percent based on the amount of terpolymer in the composition, and includes alkali metal salt in about a 10:1 plasticizer:salt weight ratio, yielding a thermoplastic composition having a $T_g$ of about 0° C.–40° C.

The composition can be modified by increasing or decreasing the amount of the terpolymer monomers. Generally, higher factions of vinyl alcohol will provide increased adhesion, tensile strength, glass transition temperature, and dielectric constant while reducing solubility and increasing sensitivity of physical properties with water content.

EXAMPLE I

1) Safety glass grade Butvar resin, TG, was supplied by Monsanto Chemical Company and was dried under dynamic vaccum, $1\times10^{-4}$ torr, at 100° C. for sixteen hours. This resin is approximately described as a 50,000–80,000 molecular weight resin with terpolymer composition of vinyl alcohol, vinyl acetate, and vinyl butyral of 10.5–13, 0.01–1.5, and 88 weight percent respectively, and has $T_gN$ 68° C. 500 g of this dried powder was thoroughly mixed with a solution composed of 83.3 g lithium trifluoromethane sulfonate (3M Corp. FC-122) dried at 110° C. at $1\times10^{-4}$ torr for 24 hours, and 416.7 g of tetraethylene glycol dimethyl ether purchased from Aldrich Chemical Company. The flaky mixture was then compounded and extruded at elevated temperature, 150–200° C., to form a 0.025" textured film. AC impedance spectra for small disk shaped samples of this film were used to determine the ionic conductivity of the final film at room temperature and at 120° C. The AC cell used for measurement of sample ionic conductivity consist of an outer PMMA body, two PMMA plungers through which a feed wire is connected to the sample cavity, and two polished stainless steel disks, surface area equal to 2.016 $cm^2$, which sandwich the sample to be measured. Sample thicknesses were typically between 1 and 1.5 mm with a surface are of 2.016 $cm^2$. Impedance measurements were performed in a two electrode configuration over the frequency range 0.5 Hz to 1.0 MHz utilizing a Schlumberger Instruments Solartron Model Sl 1286 Electrochemical Interface in potentiostat mode and Model 1255 Frequency Response Analyzer.

DC biases were controlled at O V versus open circuit with an AC modulation of up to 2V. Temperature measurement was achieved with a Lake Shore Cryotronics, Inc. Model DRC-93C Temperature Controller equipped with an lEEE-488 interface, Model DT-470-CU-12 sensing diode, and a glass sample cavity equipped with a dry nitrogen inlet to prevent sample oxidation at high temperature. Temperature control was achieved over the range –30° C. to 110° C. using a Lauda RKS-20D refrigerating/heating circulator by submersing the glass cavity containing the impedance sample in a 1:1 ethylene glycol/water bath. Desired temperatures were set via the Lauda R61 RS-232 interface and allowed to stabilize for one-half to one hour at each temperature prior to collection of impedance data depending on the temperature difference between points. Data was collected as the impedance magnitude, 1Zl, and phase angle, θ, as a function of frequency, v. The room temperature conductivity was measured to be $3\times10^{-5}$ $\Omega^{-1}cm^{-1}$ while the conductivity at 120° C. was determined to be $7\times10^{-4}$ $\Omega^{-1}cm^{-1}$.

Values of the glass transition temperatures of ironically conducting plasticized PVB resins were determined by DMTA, dynamic mechanical thermal analysis, measurement. Measurement of the complex tensile moduli were made as a function of temperature using a Polymer Laboratories Dynamic Mechanical Thermal Analyzer at frequencies of 1 and 10 Hz between –100° C. and 100° C. The rate of heating was 1.5° C./min. Samples for the DMTA experiment were prepared by cutting thick films of the plasticized PVB samples into bars 42 mm×10 mm×2.5 mm. The samples were then tested in the dual cantilever beam configuration with clamped beam lengths of 8 mm. The glass transition temperature was then estimated by the peak of the loss curve, tan δ, at 10 Hz. Using this method the glass transition temperature of the film described within this example was 5° C.

EXAMPLE II 600 g PVB safety glass grade resin flake MW=901<120K 0.88, 0.11+00.13 0.01–0.015 PVB, PVOH, PVAC $T_gN$ 68° C. was supplied by Dupont and dried at 75° C. under moderate vacuum, $1\times10^{-3}$ torr, for 12 hours. Tetraethylene glycol diheptanoate, 4G7, was also supplied by Dupont Company and used without further preparation. Lithium trifluoromethane sulfonate, 3M FC-122, was obtained from 3M Corporation and dried overnight at 100° C. under vacuum. The dried lithium salt was dissolved in the 4G7 plasticizer at a ⅕ weight ratio and $400_g$ of this solution was mixed with the PVB resin using a mortar and pestle to form a wet flaky material followed by repeated pressing at approximately 125 psi and 130° C. between Teflon sheets on a heated hydraulic press until an optically clear 15–25 mil thick was formed. Several films were quenched, immediately after hot pressing, in hot water, 140° F., followed by cold water, 45° F., to simulate the vinyl sheet production techniques. This quenching process assists in texturing the production film for subsequent air removal during the production of safety glass. The quenched films become cloudy as expected but gradually returned to the clear state and were significantly less tacky than unquenched films. This technique is extremely sensitive to alkali metal salt hydrophilicity. AC measurement of the film ionic conductivity by the method discussed in Example 1 resulted in a room temperature conductivity of $1\times10^{-7}$ $\Omega^{-1}cm^{-1}$ at 120° C. to $1\times10^{-4}$ $\Omega^{-1}cm^{-1}$ at room temperature.

EXAMPLE III 600 g of Monsanto PVB-resin, B-72 MW=170–250K 0.8 PVB 0.175–0.2 PVOH 1.01–0.025 PVAC $T_gN$ 76° C., was dried as discussed previously and dissolved in one liter of dry methanol, Aldrich Chemical Company. To this solution was added a solution of 417 g polyethylene glycol (average molecular weight=400 g/mol) and 83 g of lithium perchlorate. The resulting solution was mixed thoroughly, placed into a rectangular pan of sufficient length and width to insure a large enough film, and heated under nitrogen flow at 60° C. overnight. After the majority of the methanol had been removed, the temperature was increased to gradually from 60° C. to 110° C. under vacuum until a steady weight had been achieved. The resulting film was peeled from the surface of the container. The ionic conductivity ranged from $2\times10^{-5}$ at room temperature to $8\times10^{-4}$ S/cm at 120° C. The $T_g$ was measured to be 20° C. by DMTA analysis.

EXAMPLE IV

A twenty-five mil thick ironically conducting PVBbased electrolyte was prepared as in Example 1. Amorphous tungsten oxide was deposited on fluorine-doped tin oxide coated glass of sheet resistance of 20 Ω/□(Glaverbell) at a pressure of 30 mtorr, power of 1600 watts, and 11.5% oxygen to form a 4500 Å film of $WO_3$. On an identical substrate, amorphous vanadium pentoxide, $V_2O_5$, was sputter coated at 30 mtorr, 7150 watts, and 4.75% oxygen to form a film 2500 Å thick. Following the $V_2O_5$ deposition, the vanadium oxide coating was doped with lithium ions by electrolysis using a controlled potential of −3.25 Volts and a solution of 0.1M $LiClO_4$ in acetonitrile. Under these conditions, 44 $mC/cm^2$ total charge is required to discolor the $V_2O_5$ coating to a neutral grey. The 25 mil thick laminating PVB-resin based electrolyte was carefully placed on the tungsten oxide coating in a cold room at 5° C. followed by careful placement of the vanadium oxide coating on the sheet. The complete device was placed in a vacuum bag equipped with a gauze spacer located at the vacuum hose entrance to prevent the bag from sealing off the vacuum. Removal of air from the laminated device was performed at 5° C. by evacuation in the vacuum bag at approximately 25–29 inches of mercury vacuum using a Precision DD-90 direct drive vacuum pump. Lamination of the two oxide layers with the 25 mil thick PVB-resin film was accomplished by raising the temperature of the sample to 80–90° C. while under vacuum and maintaining these conditions for two to three hours. Following the lamination step, the device was removed from the vacuum bag, the edges were trimmed of excess vinyl electrolyte material, and the device was sealed with a two part room temperature cure epoxy. The ANSl Z26 standard tests for safety glazing laminated electrochromic moonroofs include 7 oz. impact dart from 30 feet and 8 oz. impact ball from 30 feet. 12"×12" impact test specimens constructed as in this example were found to pass the ANSl standards for impact for plasticizer/salt solution levels up to 50 weight percent at thicknesses of 25 mil. Thinner vinyl sheets, 10–15 mil, could be substituted with decreasing plasticizer level, 40 weight percent, while maintaining impact and sufficient ionic conductivity characteristics.

EXAMPLE V

A twenty mil thickness PVB-based lithium ion conductor was prepared in accordance with Example 2. 2500 Å of tungsten oxide was sputtered onto a 10 Ω/□ indium doped tin oxide, ITO, coated glass substrate. On an identical ITO coated substrate, a poly(anisidine) hydrocholoride film was sprayed using a Binks air gun from a methanolic solution containing 5 percent by weight oxidative polymerized anisidine. The 20 mil PVB-based electrolyte film was placed on the tungsten oxide surface at 15° C. followed by device completion with the placement of the poly(anisidine) film onto the PVB film. The entire device was placed in a vacuum bag at 90° C. and evacuated at $1×10^{-4}$ torr as in Example 4. While still in the vacuum bag, but exposed to ambient conditions, the device and bag were placed in the autoclave to dissolve any remaining air into the thermoplastic film. The autoclave cycle was a temperature ramp to 125° C. and pressure ramp to 200 psi. This temperature and pressure were reached within the first 30 minutes and held constant for one hour followed by a gradual decrease in pressure and temperature.

EXAMPLE VI

Tungsten oxide and vanadium oxide films are deposited by sputtering onto a transparent conductor composed of a poly(ethylene terephthalate) substrate coated with 20 Ω/□ indium-doped tin oxide. A 5 mil thick PVB based ionic conductor of the composition of Example 1 is cast onto the tungsten oxide surface at 140° C. using a doctor blade technique. The doped vanadium oxide substrate is then placed on top of the electrolyte and the entire stack is heated slightly to tack the $Li_xV_2O_{5-x}$ surface. 15 mils of commercially available PVB resin, SAFLEX® or BUTACITE®, is placed on both sides of the stack followed by a piece of annealed glass bent to the desired shape in pairs. The entire stack is then carefully laminated using Dearborn Glass Plant autoclave cycle briefly described in the previous example.

EXAMPLE VII

1500 Å tungsten oxide was rf sputtered onto a 5 Ω/□ ITO coated glass substrate which had previously been coated on the opposing side with a silver coating protected by an evaporated copper layer and flat black paint. 1000 Å vanadium oxide was sputtered onto a 5 Ω/□ ITO coated glass substrate and lithium doped to a neutral grey color to form the opposing electrode and a complete the coatings necessary for electrochromic mirror fabrication. 100 g Dupont PVB terpolymer flake was dried and mixed with 100 g of a solution composed of 90 g Pycal 94 and 10 g lithium trifluoromethanesulfonate using a mortar and pestel. The resulting paste was heated to 90° C. and applied to the tungsten oxide electrode surface using a doctor blade at a thickness of 15 microns. While the electrolyte was still hot, the vanadium oxide layer was placed onto the electrolyte surface. The entire mirror was then pressed at 90° C. on a hydraulic press at 100 psi until the electrolyte thickness was 10 microns. The excess electrolyte was removed from the mirror edges with a razor blade and sealed with a epoxy sealant.

We claim:

1. An electrically insulating and ionically conducting solid, thermoplastic composition comprising:

(A) a terpolymer comprising (a) vinyl butyryl, (b) vinyl alcohol, and (c) vinyl acetate present in said terpolymer in weight fractions of a:b:c of 0.7–0.9: 0.1–0.3: 0.01–0.05, respectively, said terpolymer (i) having a number average molecular weight between about 20,000 and 300,000 and (ii) a Tg between about 40° and 80° C.;

(B) polyether containing plasticizer compatible with said terpolymer present in said composition in an amount up to about 50% by weight based on the amount of said terpolymer present in said composition; and (C) alkali metal salt;

wherein said thermoplastic composition has a Tg between about −25° C. and 40° C.

2. The composition according to claim 1, wherein said alkali metal salt is present in said composition in an amount between about 5:1 and 20:1 by weight based on the amount of said plasticizer in said composition.

3. The composition according to claim 1, wherein said terpolymer has a number average molecular weight between about 50,000 and 200,000.

4. The composition according to claim 1, wherein said polyether containing plasticizer is selected from the polyethylene glycol dimethyl ethers.

5. The composition according to claim 1, wherein said alkali metal salt is selected from salts of sodium and lithium.

6. The composition according to claim 1, wherein said alkali metal salt is selected from the group consisting of nitrates, chlorides, perchlorates, sulfates and sulfonates.

7. An electrically insulating and ionically conducting solid, thermoplastic composition comprising:

(A) a terpolymer comprising (a) vinyl butyryl, (b) vinyl alcohol, and (c) vinyl acetate present in said terpolymer in weight fractions of a:b:c of 0.7–0.9: 0.1–0.3: 0.01–0.05, respectively, said terpolymer (i) having a number average molecular weight between about 50,000 and 200,000 and (ii) a Tg between about 40° and 80° C.;

(B) polyether containing plasticizer compatible with said terpolymer present in said composition in an amount between about 30% and about 50% by weight based on the amount of said terpolymer present in said composition; and (C) alkali metal salt, present in said composition in an amount of about a 10:1 plasticizer:salt weight ratio;

wherein said thermoplastic composition has a Tg between about 0° C. and 40° C.

* * * * *